No. 764,246. Patented July 5, 1904.

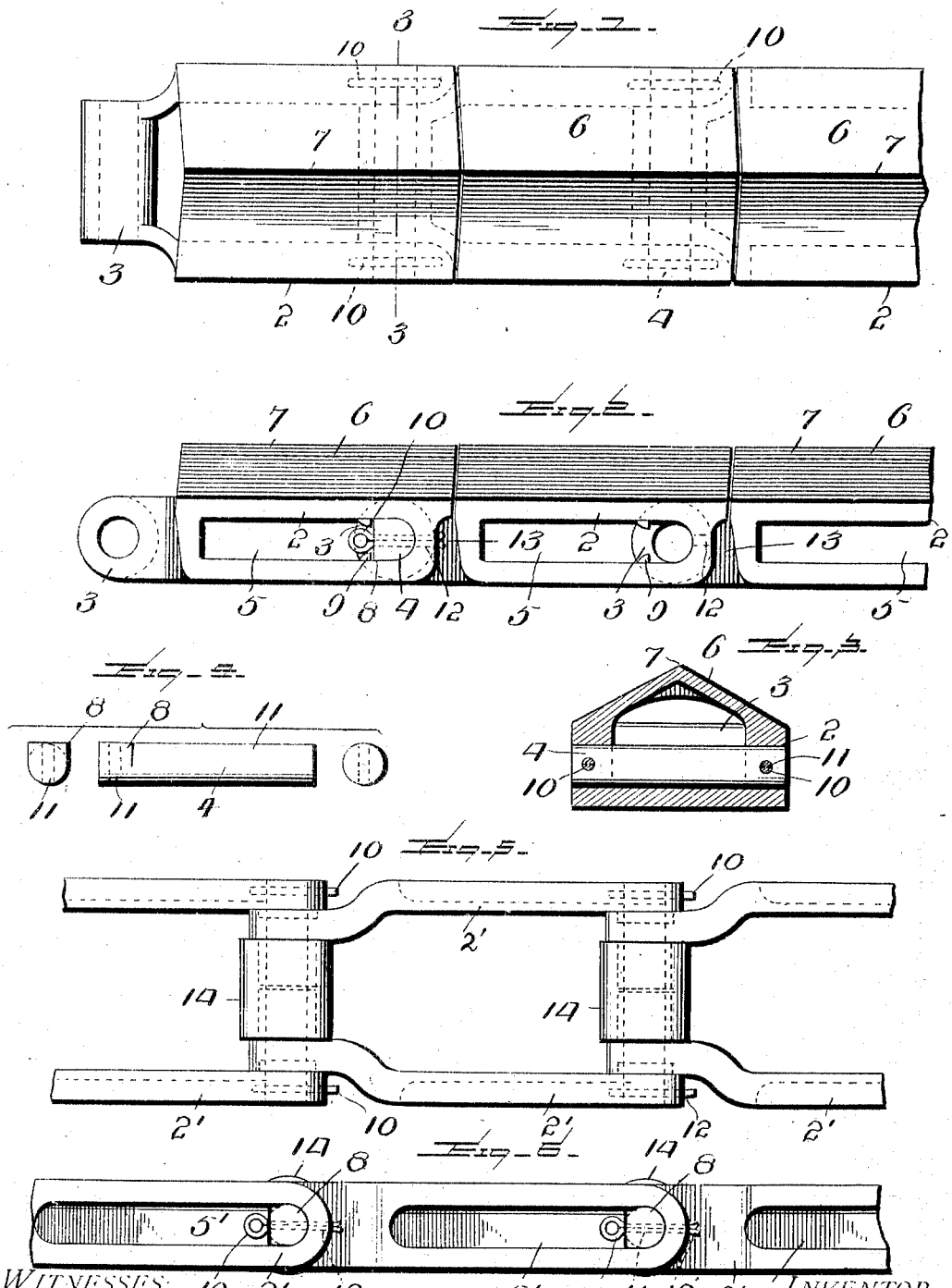

UNITED STATES PATENT OFFICE.

CHRISTOPHER W. LEVALLEY, OF MILWAUKEE, WISCONSIN.

CHAIN.

SPECIFICATION forming part of Letters Patent No. 764,246, dated July 5, 1904.

Application filed August 13, 1902. Serial No. 119,551. (No model.)

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Chains, of which the following is a specification.

My invention has for its object to produce a chain which is particularly adapted for driving and conveyer purposes, the links of which are united by means which will permit the connection and disconnection of the separate links of the chain when they are in line with each other or when they may be turned into any angular position; and the invention consists in certain improvements in a chain of this character, as will be hereinafter pointed out.

In the accompanying drawings, Figure 1 is a top plan view of a short section of one form of a chain embodying my improvements. Fig. 2 is a side elevation of the same. Fig. 3 is a transverse sectional view taken on the line 3 3 of Fig. 1. Fig. 4 illustrates the connecting-pintle detached, showing the same in side view and also showing elevations of the opposite ends thereof. Fig. 5 is a plan view of another form of my invention, and Fig. 6 is an edge or side view of the form of my invention shown in Fig. 5.

My present improvements are particularly adapted for embodiment in a transfer-chain such as is commonly used in saw and planing mills and other places, an example of such chain being found in my Patent No. 615,285, of December 6, 1898, and I have in Figs. 1 to 3 illustrated such a chain. The improvements are not, however, limited to a chain of any particular construction, as may be seen by reference to Figs. 5 and 6, where the invention is applied to a chain each link of which comprises separate side bars.

Referring particularly to Figs. 1, 2, and 3, 2 2 represent the side bars of the links, and 3 the perforated or tubular cross-bars or end pieces, which are adapted to occupy positions between the free ends of the side bars of adjoining links in a manner well known in this art. The free ends of the side bars are formed with bearings for cross-pins or connecting-pintles 4, and each pintle is adapted to pass through the aperture in the cross-bar 3, which constitutes a wearing-bearing therefor, and to engage with the bearings in the free ends of the side bars, thus uniting the adjoining links and forming the articulations or joints of the chain. Each side bar is preferably longitudinally slotted, as at 5, and the opposite side bars of each link are united by a roof or connecting top piece 6, shaped to form a central longitudinal edge or apex 7. The advantages incident to a chain of this type are pointed out in my aforesaid patent and need not be herein repeated. It is often desirable in chains of this kind to be able to couple or uncouple the separate links in chains where there is little or no slack and the links are in line with each other or when the links are in position upon a sprocket-wheel, and the connecting means which I have invented and which I will now describe in detail permit this. Each pintle is preferably formed of a cylindrical pin or bar of steel, having at one end a head of suitable shape or construction to prevent rotation of the pin after it is once properly seated in a side bar. The particular shape or construction of this head is not material as long as it operates to prevent the rotation of the pintle. I prefer that it should be half square, as indicated at 8 in Figs. 2 and 4. The flat faces of this head 8 are adapted to engage with the side edges of the slot or aperture 5 in the side bar, and thus prevent rotation. I prefer to provide one or each of the side bars of each link with stops 9, extending inward from the side faces of the slots 5 adjacent to the bearings for the pintle 4 and arranged to engage with the head 8 of the pintle and prevent any movement of the pintle in the direction of the length of the chain. It might happen, should the chain be slack or the links be turned into certain angular relations to each other, that a pintle would tend to slide in the slots 5 and leave its bearings in the free ends of the side bars; but the aforesaid stops 9 effectively guard against any such movement.

It is desirable not only to prevent the pintle from rotating in its seats in the side bars, but also to prevent it from moving longitudinally—that is, in a direction transverse to the chain—after it has been put in place to unite it to the adjacent links. For this purpose I prefer to use split keys 10, which pass through apertures 11 in the pintles and registering apertures 12 in the ends of the side bars. These means for uniting the links permit the employment of pintles the length of which is not greater than the distance between the outer faces of the opposite side bars, so that when the chain is assembled there are no parts of the chain proper projecting beyond the outer side faces of the links.

The slots 5 permit the ready insertion and removal of the keys 10, which serve to connect the pintles with the links and prevent any longitudinal movement of the pintles.

It will be seen that the side bars 2 at each side of the chain are in line with each other and also that the adjacent ends of the side bars are so shaped as to leave a space 13 (see Fig. 2) between the side bars of the adjacent links. This allows ample room for the split and spread ends of the keys 10.

It will be observed that the apertures 11 are formed in the stem portions of the pintles—that is, in the pintles proper—and that the keys 10 when in place are substantially parallel with the side bars of the links and, further, that the keys are disposed between planes intercepting the opposite—that is, the inner and outer—faces of the side bars and also between planes intercepting the upper and lower edges or faces of such side bars.

In Figs. 5 and 6 are represented a somewhat different form of my invention wherein the side bars 2' are represented as being separate from each other. The side bars instead of being cut away or reduced to form slots, as represented at 5 in the form of invention already described, are cut away or reduced only sufficiently to produce longitudinal channels or grooves 5' of a depth sufficient to receive the heads 8 of the pintles and the exposed parts of the connecting-keys 10. The connecting-pintles which are used in this form of my chain may be similar to those which have already been described. Wearing sleeves or cylinders 14 surround the pintles between the inner faces of the side bars. In this embodiment of my invention the parts of each link situated between the free ends of the connected link correspond to and may be termed the "end bar," although it is formed of a plurality of parts.

A key or connecting piece uniting the pintle with the chain may be and preferably is used at each end of the pintle, as represented in Fig. 1; but under some circumstances a single key for each pintle would probably be sufficient. The split key has been chosen as the most simple and convenient device for holding the pintle in place; but it should be understood that my invention is not limited to this specific device, as other means which accomplish the same result might be used in place of the split key.

A chain of this character is particularly adapted for conveyer uses, as the side bars of the links have broad faces for bearing upon the surfaces over which the chain runs, and because of the connecting-pintles and the means which are employed for preventing any longitudinal movement of the pintles within their bearings being arranged entirely within the planes bounding the sides of the chain there are no projecting parts which tend to catch or cause undue friction and wear. The chain may thus be arranged in a closely-fitting groove or channel, which is often desirable. The keys which unite the pintles with the end bars prevent any rotation of the pintles in their bearings in the said bars, the entire wear at the joints or articulations of the chain being taken by the comparatively long central portions of the pintles which engage with the tubular cross-bars 3.

It will be observed that the pintle, which is of a length not exceeding the distance between the outer faces of the opposite side bars, is cylindrical in shape throughout a portion of its length equal at least to the combined length of the seats or wearing surfaces for it formed in an end bar and one of the side bars, and these seats or wearing-surfaces are shaped to fit the cylindrical pintle. This construction, as has been described, permits the insertion of the pintle from one side of the chain by a simple endwise movement whatever may be the angular relations to each other of the two links being united.

What I claim is—

1. A chain comprising links, pintles for uniting such links, the stem portions of pintles and the links being each perforated, keys arranged to pass through the said perforations in the pintles and the links for holding the pintles in place, and means for causing the said perforations to register when the pintles are in their seats, substantially as set forth.

2. A chain comprising side bars which are cut away between their upper and lower edges, pintles which unite the side bars and detachable means arranged to unite the pintles and the side bars having exposed parts situated in the said cut-away portions of the side bars, substantially as set forth.

3. A chain comprising side bars having pintle-bearings in their ends, and the perforations 12 disposed transversely to the said bearings, connecting-pintles adapted to rest in the said bearings and having perforations 11 which are adapted to register with the said perforations 12 and keys arranged to pass through the said perforations and connect the pintles and side bars, substantially as set forth.

4. A chain comprising side bars having pintle-bearings near their ends, the connecting-pintles having heads arranged to engage with the side bars and prevent the pintles from turning in their bearings in the side bars and keys arranged to pass through registering apertures in the pintles and side bars and operating to prevent longitudinal movement of the pintles in their bearings, said keys being substantially parallel with the side bars, substantially as set forth.

5. A chain comprising side bars having longitudinal slots 5, and pintle-bearings near their ends, pintles fitted to the said bearings and provided with means which engage with the side bars to prevent rotation of the pintles in their bearings and keys adapted to pass through registering apertures in the pintles and side bars, the ends of the said keys extending into the said slots in the side bars, substantially as set forth.

6. A chain comprising side bars formed with longitudinal slots 5 and pintle-bearings at the ends of the slots, the pintles arranged to fit the said bearings of the side bars, and formed with the heads 8, there being stops 9 carried by the side bars and arranged to engage with the heads of the pintles and prevent the pintles from moving lengthwise of the chain, and means for uniting the pintles and side bars to prevent longitudinal movement of the pintles in their bearings, substantially as set forth.

CHRISTOPHER W. LEVALLEY.

Witnesses:
  H. H. SARGENT,
  WM. C. SARGENT.